United States Patent [19]

Chayer

[11] Patent Number: 5,029,758
[45] Date of Patent: Jul. 9, 1991

[54] HIGH-EFFICIENCY, PORTABLE CAR WASHING SYSTEM

[76] Inventor: Steven A. Chayer, 6738 Fifth Ave. NW, Seattle, Wash. 98117

[21] Appl. No.: 377,338

[22] Filed: Jul. 6, 1989

[51] Int. Cl.⁵ .......................... E01H 3/02; B05B 15/08
[52] U.S. Cl. ................................. 239/172; 239/318; 239/280; 239/588; 239/288
[58] Field of Search ............... 239/588, 280, 172, 288, 239/288.3, 288.5, 195, 310, 318

[56] References Cited

U.S. PATENT DOCUMENTS

| | | | |
|---|---|---|---|
| 555,147 | 2/1896 | Burck | 239/588 |
| 1,403,140 | 1/1922 | Wiggins | 239/588 X |
| 1,889,201 | 11/1932 | Holveck | 239/597 |
| 2,756,449 | 7/1952 | Dewey | 15/235 X |
| 2,798,435 | 7/1957 | Armstrong | 239/195 |
| 3,504,858 | 4/1970 | Liddiard | 239/172 |
| 3,599,869 | 8/1971 | Oberdorfer | 239/172 |
| 3,672,380 | 6/1972 | Schuster | 239/288.5 X |
| 3,680,786 | 8/1972 | Levy | 239/146 |
| 3,831,849 | 8/1974 | Studinger | 239/172 X |
| 4,089,446 | 5/1978 | Logan et al. | 239/172 X |
| 4,383,935 | 5/1983 | Hull | 252/359 E |
| 4,546,903 | 10/1985 | Burch | 222/130 |
| 4,821,958 | 4/1989 | Shaffer | 239/172 X |

FOREIGN PATENT DOCUMENTS 2536225 3/1977 Fed. Rep. of Germany ........ 15/264

*Primary Examiner*—Andres Kashnikow
*Assistant Examiner*—Kevin Weldon
*Attorney, Agent, or Firm*—Christensen, O'Connor, Johnson & Kindness

[57] ABSTRACT

A portable car wash system that uses water efficiently to wash cars in a parking lot is provided. A push cart (20) is mounted on wheels (22) and contains a water supply tank (42), an engine (40), and low- and high-pressure pumps (50 and 52). The engine drives the pumps. The low-pressure pump pumps water out of the tank and the high-pressure pump boosts the pressure of the water. The high-pressure water is delivered to a wand (12) via a hose (16) attached to a hose reel (48). The wand includes a positionable head (13) that can be aimed to direct a high-pressure spray (224) from a nozzle (208) to the car being washed. A spray shield (210) reduces overspray from the nozzle. A locking member (204) holds the head in a desired position. A washing tool (14) having a sponge (234) and cover (236) is used by an operator (18) to hand wash the car. A soap injection system (46) injects soap into the water by conventional venturi action when selected by the operator. The system is small enough to not disrupt traffic in the parking lot, can be used to wash a parked car without spraying adjacent cars, and uses only four to six gallons of water to wash a car.

29 Claims, 1 Drawing Sheet

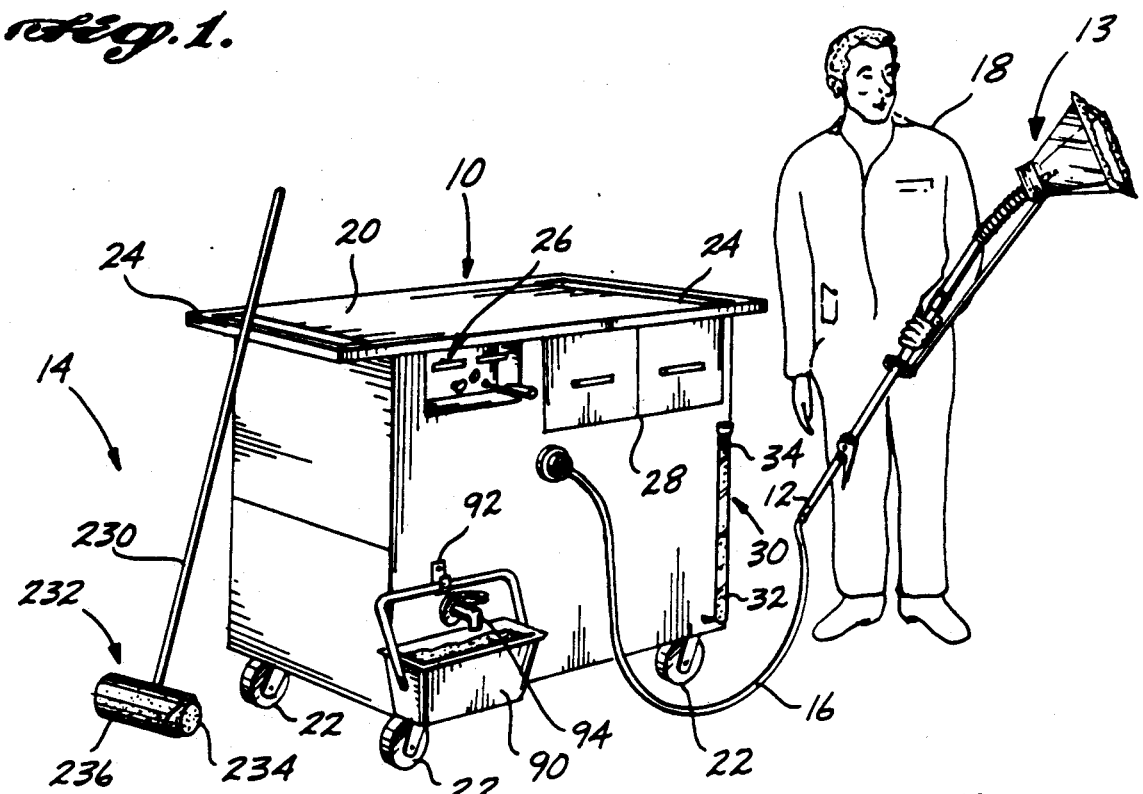

HIGH-EFFICIENCY, PORTABLE CAR WASHING SYSTEM

FIELD OF THE INVENTION

This invention relates to car washing, and particularly, to portable car washing systems.

BACKGROUND OF THE INVENTION

Over the years, commercial car wash facilities have become quite prevalent. These facilities range anywhere from fully automatic car wash systems to do-it-yourself systems. In a typical automatic car wash system, the driver either remains in the car or leaves the car and waits while it is automatically pulled through the car wash. Automatic system typically wash, rinse, dry and, at the driver's option, wax the car. On the other hand, do-it-yourself systems, as the name implies, require that the driver park the car in a stall and wash the car him or herself. These do-it-yourself systems provide the ingredients and tools necessary to wash the car. The person washing the car usually uses a wand to apply the ingredients and the water under both high and low pressure.

One problem associated with many automatic car wash systems found in the prior art is that they use brushes to clean cars. Many people will not take their car to this type of car wash because of their concern that the brushes may scratch the car's paint finish. Another problem associated with some automatic systems, and many types of do-it-yourself car wash systems, is that they use a highpressure water spray to clean cars instead of brushes or sponges. While these high-pressure systems are less likely to scratch a car's finish than are systems that use brushes, they are also less effective in removing film from the car's finish. Films, such as salt spray and oil, are usually not removed by the high pressure spray. Unfortunately, if not removed, these films, especially salt spray, can damage the car's finish.

Another problem associated with automatic and do-it-yourself car wash systems found in the prior art is that they use a substantial amount of water for each car washed. In some automatic systems, this is caused, in part, because the amount of water used in preset at an amount sufficient to wash large cars and trucks, which results in water wastage when smaller cars are washed. Water wastage is also a common occurrence in do-it-yourself systems. Most of these systems are coin-operated, which requires the person to purchase system time by inserting an appropriate number of coins in the system. Obviously, if the person overestimates the time needed to wash the car, water may be wasted. In any event, both the automatic and do-it-yourself systems of the prior art are susceptible to excessive water use.

Another problem associated with automatic and do-it-yourself car wash facilities is that a person must take the car (or other vehicle) to the facility to get it washed. While the person is waiting for the car to be washed, in the case of an automatic system, or while the person washes the car, in the ease of a do-it-yourself system, the person, in most cases, is prevented from performing other tasks. A portable car wash system that could be taken to a person's car and wash the car while that person performed some other activity would alleviate this problem. Unfortunately, prior art portable car washes are typically large and cumbersome. Many types of these portable car washes are truck mounted, which makes it difficult to use them in confined areas, such as parking lots, for example. Further, many prior art portable systems require connections to external sources of water, compressed air, and/or electricity, which makes it difficult to use them in remote areas, again such as in a large parking lot.

Another type of portable car wash system found in the prior art is a do-it-yourself attachment for the end of a garden hose. In addition to supplying water to the car, the attachment usually permits soap or wax to also be applied. One problem associated with this type of attachment is that it requires an external supply of water and, thus, the car must be located near a source of water, such as an outdoor spigot, for example. Another problem with these attachments is that they deliver water to the car at a relatively low pressure and, as a result, may not be completely effective in removing dirt and film from the car.

As can be readily appreciated from the foregoing discussion, there is a need for an efficient, portable car wash system that can be used in congested areas, such as parking lots. Ideally, such a system would permit washing a parked car without wetting adjacent cars. Such a system would permit the drivers of the washed cars to go about their business while their car is being washed in the parking lot. Further, the system should effectively remove dirt and film from the car. This invention is directed to a compact, high-efficiency, portable car wash system that achieves these results.

SUMMARY OF THE INVENTION

In accordance with the present invention, a high-efficiency, portable car wash system for use in parking lots is provided. The system comprises a main unit, a wand, and a washing tool. The main unit supplies water under pressure to the wand. The wand delivers the water as a high-pressure spray. The main unit may also supply soap mixed with the water under pressure to the wand. The wand is handheld and has a positionable head to concentrate the high-pressure spray to the surface of a car being washed. The washing tool includes an elongated handle with a sponge and nonabrasive covering located at one end of the pole. The washing tool is used to wash the car after the water and soap have been applied via the wand. The car is then rinsed with the high-pressure spray from the wand.

In accordance with further aspects of the present invention, the main unit is a pushcart having mounted therein: an engine; a water supply tank; a water delivery system; and, a soap injection system. The engine drives the water delivery system, which pumps water from the water storage tank and delivers the water under pressure to the wand. Soap may be added to the water by soap injection system. Soap injection is selectable by the operator.

In accordance with still further aspects of the present invention, the water delivery system includes a low-pressure pump and a high-pressure pump that are driven by the engine. The low-pressure pump pumps water from the water storage tank and supplies water to the high-pressure pump, which boosts the pressure of the water to at least 600 psi. A slip clutch engages the output shaft of the engine and causes the engine to drive the low-and high-pressure pumps when the engine operates at a high speed and disengages the output shaft when the engine operates at a low speed. The output shaft is coupled to the low-and high-pressure pumps by a belt.

In accordance with still further aspects of the invention, the wand includes an elongated, tubular handle connected at one end to the high-pressure pump by a hose and at the other end to the positionable head. The positionable head includes a flexible neck, a nozzle, and a spray shield. One end of the flexible neck is connected to one end of the handle and the other end is connected to the nozzle. The nozzle connects the water under pressure to the high-pressure spray. The spray shield is connected to the nozzle and reduces the overspray of the wand. The wand further includes a locking member having a rod attached at one end to the spray shield and a locking ring positionable along the handle attached to the other end of the rod. Moving the locking ring along the handle moves the rod, which thereby causes the flexible neck to bend and aim the spray from the nozzle and the spray shield in a desired direction. The nozzle produces a substantially flat, fan-shaped spray pattern to effectively remove dirt from the car.

In accordance with yet further aspects of the present invention, the system uses between four and six gallons of water to wash a car.

As will be appreciated from the foregoing summary, the invention provides a portable car wash system that can be used in congested areas such as parking lots without disrupting traffic and without wetting cars adjacent to the car being washed. Further, the invention uses very little water to wash each car.

BRIEF DESCRIPTION OF THE DRAWINGS

The foregoing and other features and advantages of this invention will become more readily appreciated as the same becomes further understood by reference to the following detailed description when taken in conjunction with the accompanying drawings, wherein:

FIG. 1 is an isometric view of a portable car wash system formed in accordance with the present invention; and, FIG. 2 is a simplified schematic diagram of a preferred embodiment of the system depicted in FIG. 1.

DESCRIPTION OF THE PREFERRED EMBODIMENT

Turning first to FIG. 1, there is depicted a high-efficiency, portable car wash system formed in accordance with the present invention. The system comprises: a main unit 10; a wand 12; and, a washing tool 14. The main unit 10 supplies high-pressure water to the wand 12 via a hose 16. The main unit 10 may also inject soap into the water stream traveling to the wand 12. Soap injection is selectable by an operator 18. High-pressure water (with or without soap) is discharged from a head 13 of the wand 12. The operator 18 holds the wand 12 so that water being discharged form the head 13 of the wand 12 is directed to the car being washed (not shown in FIG. 1). Once soap and water have been applied to the car, the operator 18 proceeds to hand wash the car using the washing tool 14. As will be discussed more fully below, the washing tool basically consists of a long handle with a sponge and cover attached to one end. After the car has been washed with the washing tool 14, the operator 18 rinses the car with high-pressure water from the wand 12.

As will become better understood from the following discussion, the system of the present invention is completely self-contained and, once set up, does not require the use of external power or water supplies. As will also become better understood from the following discussion, the system makes efficient use of water due, in part, to the design of the head 13 of the wand 12 and the use of the washing tool 14.

As illustrated in FIG. 1, the main unit consists primarily of a compact pushcart housing 20 have an internal frame (not shown) and enclosed ends, sides, and top. The pushcart 20 may be rolled about on a set of four casters 22 (only three shown in FIG. 1). One or more of the casters 22 may be of the locking type to prevent unwanted movement of the pushcart 20. The pushcart 20 includes handles 24 at each end. The pushcart 20 has an external control panel 26 that contains several controls, which may be operated by the operator 18 and will be discussed more fully below. A level indicator 30, consisting of a sight glass 32 and a float 34, is mounted to the side of the pushcart 20 and represents the amount of water contained inside the main unit 10. The pushcart 20 preferably includes storage capacity in the form of horizontal pull-out drawers 28 located along the side of the pushcart 20.

As noted above, the pushcart 20 is compact. In one physical embodiment of the present invention, the pushcart 20, depicted in FIG. 1, is approximately 2 ½ feet wide by 4 feet long by 3½ feet high. As can well be appreciated by a person of ordinary skill in the car washing art, a pushcart having these approximate dimensions can be easily maneuvered in a parking lot without disrupting traffic flow in the parking lot. In particular, such a pushcart can be positioned in front of, or behind, the car being washed, such that other cars may pull into or out of parking spaces adjacent to the car being washed. In addition, other traffic in the parking lot would not be disrupted by the pushcart 20. Accordingly, and as will become better understood from the following discussion, the portable car wash system of the present invention is particularly well suited for washing cars in congested areas, such as in store parking lots, for example.

Turning now to FIG. 2, there is illustrated a simplified schematic diagram of the portable car wash system depicted in FIG. 1 and discussed above. The pushcart 20 contains the following components: an engine 40; a water supply tank 42; a water delivery system 44; a soap injection system 46; and, a hose reel 48. In accordance with the preferred embodiment of the invention, the water delivery system 44 comprises: a low-pressure pump 50; a high-pressure pump 52; and, a pressure relief valve 54. Also in this embodiment, the soap injection system 46, comprises: a soap container 56; a venturi fitting 58; a bypass valve 60; and, tubing 62.

In accordance with one physical embodiment of the present invention, the engine 40 is a gas-powered, internal combustion engine. An output shaft 41 of the engine 40 is connected to the low-pressure pump 50 and high-pressure pump 52 by a drive belt 64. Accordingly, the engine 40 drives the low- and high-pressure pumps 50 and 52. Water is pumped from the water supply tank 42 by the low-pressure pump 50 via a water supply line 100. Preferably, an in-line filter 66 is located in the supply line 100 to filter the water as it is pumped out of the tank 42. The low-pressure pump 50 supplies water to the soap injection system via a low-pressure line 102.

The venturi fitting 58 and the bypass valve 60 are piped in parallel, such that the low-pressure water from the low-pressure pump 50 is supplied to one side of each. Depending on the position of the bypass valve 60 (i.e., open or closed) the water in the low-pressure line 102 is either directed entirely through the venturi fitting 58 or through both the venturi fitting 58 and the bypass valve 60. As indicated previously, the injection of soap into the system is selectable by the operator 18 (FIG. 1). The operator 18 selects whether the soap is injected into the system by controlling the bypass valve 60. That is, when the operator 18 chooses to inject soap into the water for washing a car, for example, the operator 18 closes the bypass valve 60 so that all of the water from the low-pressure pump 50 passes through the venturi fitting 58. The water flow through the venturi fitting 58 is such that soap is drawn from the container 56 into the fitting 58 through tubing 62 and, hence, into the water in low-pressure line 102. The soap is drawn from the container 56 through the conventional venturi action of the venturi fitting 58. When the operator 18 wishes to rinse the car, or for other reasons wishes to eliminate soap from the water, the operator 18 opens the bypass valve 60. The opened bypass valve 60 causes water from the low-pressure pump 50 to flow through both the bypass valve 60 and the venturi fitting 58. The resulting water flow through the venturi fitting 58 is insufficient to cause soap to be pulled from the container 56 by the venturi action of the venturi fitting 58.

Water from the soap injection system, which may or may not contain soap, is supplied to the high-pressure pump 52 via low-pressure line 102A. The high-pressure pump 52 boosts the pressure of the water in the low-pressure line 102A and provides water (and possibly a water/soap mixture) at a high pressure in high-pressure line 104. In accordance with one physical embodiment of the invention, the low-pressure pump provides water at a pressure of 60 psi and the high-pressure pump boosts the low-pressure water to 600 psi.

The water in high-pressure line 104 passes through a pressure relief valve 54. If the pressure of the water in line 104 exceeds a predetermined level, the pressure relief valve causes the water to be recirculated to the high-pressure pump via the low-pressure line 102A. As long as the water pressure in the high-pressure line 104 is less than or equal to the predetermined level, the pressure relief valve 54 causes the high-pressure water to flow to the hose 16, which is connected to the hose reel 48. The hose reel 48 is preferably a conventional, spring biased hose reel that permits the hose 16 to be pulled off the reel by the operator 18. The hose reel 48 includes a ratchet or other comparable locking system to prevent the fed-out length of hose 16 from rewinding on the hose reel 48. When the operator 18 wishes to rewind the hose 16, the ratchet is released (usually accomplished by a slight pulling tension on the hose 16), which causes the hose reel 48 to pull in the extended hose 16. As previously indicated, the high-pressure water in the hose 16 is supplied to the wand 12, which is discussed in greater detail below.

The water supply tank includes an opening 70 and a cap 72. The water supply tank 42 is filled with water through the opening 70, which is then covered by the cap 72 to prevent spillage. The supply tank 42 includes a drain line 106 and a drain valve 74. During normal operation, the drain valve 74 is closed. When the operator 18 wishes to drain the water supply tank 42, the drain valve 74 can be opened to permit the water in the tank 42 to drain through the drain line 106. As oriented in FIG. 2, the drain line 106 is positioned near the bottom of the tank 42 to permit all of the remaining water to drain. The supply line 100 enters the top of the supply tank 42 and extends downward the bottom of the tank 42. The level indicator 30 is connected to the water supply tank 42 by a tube 76. In one physical embodiment of the present invention, the water supply tank holds approximately 60 gallons of water, which is sufficient to wash approximately 10 to 15 cars. That is, in this embodiment, four to six gallons of water are used to wash each car.

As indicated above, the pushcart 20 includes an external control panel 26, which houses several controls used by the operator 18 to control the main unit 10. As further illustrated in FIG. 2, these controls include: a key switch 80; a pull rope 82; a throttle control switch 84; a manual choke switch 88; and, a soap injector switch 86. The key switch 80 has an on-off position and allows the engine 40 to be started with the rope pull 82 when the key switch 80 is in the on position. The engine 40 cannot be started if the key switch 80 is in the off position and, thus, may be used to secure the system. Similarly, once the engine 40 is running, it can be shut off by turning the key switch 80 to the off position. The manual choke switch 88 is provided to assist starting the engine 40.

The speed of the engine 40 is controlled by the throttle control switch 84. In accordance with one physical embodiment of the present invention, the throttle control switch 84 has a low- and high-speed position. In this embodiment, the engine 40 includes a slip clutch 68 coupled to the output shaft 41 of the engine 40. When the throttle control switch 84 is in the low-speed position, the slip clutch 68 permits the engine to idle without operating the low-and high-pressure pumps 50 and 52. When the throttle switch 84 is switched to the high speed position, the slip clutch 68 engages the output shaft 41 and causes the engine 40 to drive the low- and high-pressure pumps 50 and 52 via the belt 64. Accordingly, when the operator 18 does not need high-pressure water to wash or rinse a car, such as when he is using the washing tool 14, the throttle control switch 84 is switched to the low speed position. By idling the engine 40 in the low speed position, fuel consumption is reduced, as is wear and tear on the high-pressure lines caused by the high water pressure in the lines.

The soap injection switch 86 is also provided at the control panel 26 and consists of a two-position switch that opens and closes the bypass valve 60. In accordance with one physical embodiment of the invention, the control switch 86 is a lever that is connected by appropriate linkage to the bypass valve 60. The operator 18 simply pulls or pushes the lever, which causes the bypass valve 60 to open or close as desired.

As best depicted in FIG. 1, the portable car wash system of the present invention, may also include a bucket 90 secured to the side of the pushcart 20 by a bracket 92. As illustrated in FIG. 2, water is supplied to the bucket 90 via a spigot 94 connected to the low-pressure line 102. Water in the bucket 90 is used to saturate and/or rinse the washing tool 14 when the washing tool 14 is used to wash the car. If desirable, soap may be manually added to water in the bucket 90.

The wand 12, which was discussed briefly above, is discussed in greater detail next. As depicted in FIG. 2, the wand 12 includes: an elongated, tubular handle 200; a trigger 202; a positionable head 13; and, a locking member 204. The head 13 further comprises: a flexible neck 206; a nozzle 208; and, a spray shield 210. The locking member 204 further comprises: a rod 212 and a locking ring 214.

The head 13 is connected to one end of the handle 200. The hose 16 is connected to the end of the handle 200. The trigger 202 is mounted on the handle 200 and is hand operated to control the flow of high-pressure water from the hose 16 to the head 13. In accordance with one physical embodiment of the invention, the trigger 204 operates a conventional shut-off valve in the handle 200 (not shown). Operation of the trigger 202 either shuts off water to the head 13 or permits all of the water to flow to the head 13. It is to be understood, however, that the trigger 202 could be designed to allow variable water flow to the head 13.

The end of the handle 200 opposite the hose 16 is connected to one end of the flexible neck 206. Preferably, the flexible neck 206 consists of a flexible high-pressure hose 207 inside a coil spring 205, which runs the length of the hose 207. In a conventional manner, the coil spring 205 biases the hose 207, such that when the hose 207 and spring 205 are bent into curved position, the spring 205 acts to bias the hose 207 toward a straight position, preferably in line with the handle 200.

The spray nozzle 208 is connected to the other end of the flexible neck 206. The nozzle discharges the high-pressure water from the hose 16 as a high-pressure spray 224. In accordance with one physical embodiment of the present invention, the nozzle produces a flat, 25° fan-spray pattern, which produces a knife-edge effect for effectively washing and rinsing a car. The spray shield 210 has a base 216 that is connected to the nozzle 208 and the flexible neck 206. The spray shield 210 has an opening 218 opposite the base 216, and is substantially larger than the base 216, which permits high-pressure spray from the nozzle 208 to exit the spray shield 210. Preferably, the shape of the spray shield 210 is similar to the pattern of the spray 224 exiting the nozzle 208. In this manner, the spray shield 210 assists in directing the spray 224 and also substantially reduces any overspray from the nozzle 208. As a result, inadvertent spraying of adjacent cars is virtually eliminated. The spray shield 210, preferably, includes a soft, nonabrasive material 222 around the perimeter of the opening 18. This nonabrasive material 222 prevents scratching of the car's surface by the spray shield 210.

As noted above, the head 13 of the wand 12 is positionable. This feature is made possible by the combination of the flexible neck 206 (noted above) and the locking member 204, which is described next. The rod 212 of the locking member 204 is pivotally connected to the base 216 of the spray shield 210. The other end of the rod 212 is connected to the locking ring 214. The locking ring 214 is placed over the handle 200. The diameter of the hole in the locking ring 214 is slightly larger than the diameter of the handle 200, such that the locking ring may be slid along the handle 200 as long as the opening of the locking ring is maintained substantially perpendicular to the length of the handle 200. However, when the locking ring 214 is tilted away from this perpendicular relation, the locking ring 214 is prevented from sliding along the handle 200. When the flexible neck 206 is bent, as depicted in FIG. 2, the biasing force associated with the flexible neck causes a tensioning force to be applied to the locking ring 214 via the rod 212, which causes the locking ring to be tilted, and, thus, locks the locking ring 214 in its present position on the handle 200. By moving the locking ring 214 to a desired position on the handle 200, the water spray from the nozzle 208 can be aimed in a particular direction. For example, when washing the top of a car, the neck 206 could be bent so that the nozzle 208 and spray shield 210 can direct the spray 220 straight down on top of the car's surface. By applying the water spray 224 to the top of the car in this manner, any overspray, which may hit adjacent cars, is reduced. As a further example, when the side of a car or the bumpers are to be washed, the locking ring 214 can be adjusted so as to either bend or straighten the neck 206. A bent position of the neck 206 allows the operator 18 to easily reach between the car being washed and an adjacent car and wash or rinse these areas of the car, without spraying the adjacent car. If there are no adjacent cars parked near the car being washed, the operator 18 could straighten the neck 206. In any event, the flexible neck 206 allows the operator to efficiently and effectively wash a car, even if the car is in a congested area, such as a parking lot.

To assist the operator in positioning the locking ring 214, a sleeve 220 is slidably mounted on the handle 200. By holding the sleeve 220, the operator 18 can move the sleeve 220 against the locking member 214 with sufficient force to move the locking member 214 along the handle 200.

The washing tool 14, as best depicted in FIG. 1, includes an elongated handle 230 having a T-shaped end 232. A cylindrical sponge 234 covers the T-shaped end 232. Preferably, the sponge 234 has a high tensile strength so as to resist tearing while being used to wash a car. A nonabrasive cover 236 is placed over the sponge 234. The cover 236 is much softer than brushes used in prior art car wash systems and allows the operator 18 to provide hand washing of a customer's car via the sponge 234 and cover 236 of the washing tool 14. In accordance with one physical embodiment of the invention, the cover 236 is a simulated sheep skin cover secured about the sponge 234 by hook- and loop-type fasteners. The handle 230 allows the operator to easily and quickly reach all surfaces of the car being washed. Further, there are no hard or sharp surfaces exposed at the 'T'-shaped end 232 of the washing tool 14, which could scratch the surface of the car.

The sponge 234 of the washing tool 14 acts to time release the water held by the sponge 234, which permits a more consistent washing of the car. That is, after the operator 18 has placed the sponge 234 into the bucket 90, and the sponge 234 has become saturated with water (which may or may not contain soap), the water contained in the sponge is gradually released as the car is washed with the washing tool 14.

As can be readily appreciated from the foregoing description, the invention provides a highly-efficient, portable car wash system that is compact enough to be used to wash cars in parking lots without disrupting traffic flow and without wetting cars adjacent to the car being washed. While a preferred embodiment of the invention has been illustrated and described herein, it is to be understood that, within the scope of the appended claims, various changes can be made. For example: an engine that operates on propane or other fuel can be used instead of a gasoline engine; different controls could be provided in the external control panel, for example, the engine could have an electric start, thereby eliminating the rope pull; the throttle control could provide for more than two speeds of the engine; the pressure ratings of the high- and low-pressure pumps could be different from those specifically stated herein; and further, a nozzle that produces a different spray pattern could also be substituted. Hence, the invention could be practiced otherwise than as specifically described herein.

The embodiments of the invention in which an exclusive property or privilege is claimed are defined as follows:

1. A portable cleaning assembly comprising:
   a portable housing;
   a water supply tank mounted to said housing;
   a supply line assembly connected to said water supply tank;
   a low-pressure pump connected to said supply line assembly for receiving water from said water supply tank and for producing and output flow at a first selected pressure;
   a soap injection system connected to said supply line assembly for selectively discharging soap into said supply line assembly;
   a high-pressure pump connected to said supply line assembly for receiving said low-pressure pump output flow and producing an output flow at a second selected pressure, said second selected pressure higher than said first selected pressure;
   an outlet spigot attached to said housing and integral with said supply line assembly to selectively provide water from said water supply tank through said low-pressure pump; and,
   a wand flexibly attached to said supply line assembly for receiving said high-pressure pump output flow and having a head through which said output flow is discharged.

2. The portable cleaning assembly of claim 1, wherein said supply line assembly further comprises a pressure relief valve coupled to said high-pressure pump, such that said pressure relief valve causes the water under high pressure to recirculate in said high-pressure pump when said high pressure of the water exceeds a predetermined level and causes the water under high pressure to be delivered to said wand when said high pressure of the water is less than said predetermined level.

3. The portable cleaning assembly of claim 1, wherein said wand comprises:
   (a) an elongated, tubular handle having a longitudinal axis and first and second ends, said first end of said handle for receiving the water under pressure; and,
   (b) a positionable head, comprising:
   (i) a flexible neck having a first end connected to said second end of said handle and a second end, said flexible neck carrying said water under pressure from said handle;
   (ii) a nozzle coupled to said second end of said flexible neck for delivering the water under pressure as said high-pressure spray; and,
   (iii) a spray shield having a base and an open end opposite said base, said base being connected to said nozzle and said second end of said flexible neck such that said high pressure spray is discharged from said open end of the spray shield.

4. The portable cleaning assembly of claim 3, wherein said flexible neck comprises:
   (a) a high-pressure hose connected at one end to said second end of said handle and at the other end to said nozzle; and,
   (b) a coil spring that encircles said high-pressure hose and is coupled at either end to said second end of said handle and to said nozzle.

5. The portable claim 3, wherein said wand further comprises locking means for locking said positionable head in a desired position.

6. The portable cleaning assembly of claim 3, wherein said wand further comprises a trigger for controlling the water flowing to said nozzle.

7. The portable cleaning assembly of claim 1, wherein said soap injection system comprises:
   a soap container;
   a venturi connector integral with said supply line assembly and located between said low-pressure pump and said high-pressure pump, said venturi coupling in fluid communication with said soap container; and,
   a valve means integral with said supply line assembly for controlling flow from said soap container.

8. The portable cleaning assembly of claim 7, wherein said valve means includes a bypass line integral with said supply line assembly, said bypass line including a valve integral with said supply line and said venturi coupling for selectively directing at least a portion of said low-pressure pump output flow around said venturi coupling.

9. The portable cleaning assembly of claim 1, further including a single motor attached to said housing for driving said pumps, said motor including a drive belt connected to said pumps.

10. The portable cleaning assembly of claim 1, further including a bucket and a bracket attached to said housing for selectively attaching said bucket to said housing adjacent said outlet spigot.

11. The portable cleaning assembly of claim 1, wherein said first selected pressure of said output flow from said low-pressure pump is approximately 60 psi.

12. The portable cleaning assembly of claim 1, wherein said second selected pressure of said output flow from said high-pressure pump is approximately 600 psi.

13. The portable cleaning assembly of claim 1, further including a trigger integral with said wand for controlling the discharge of water therefrom.

14. The portable cleaning assembly of claim 1, wherein said water supply tank has approximately a 60-gallon capacity.

15. A portable cleaning assembly comprising:
   a portable housing;
   a water supply tank mounted to said housing;
   a supply line assembly connected to said water supply tank;
   a low-pressure pump connected to said supply line assembly for receiving water from said water supply tank and for producing an output flow at a pressure of approximately 60 psi;
   a soap injection system connected to said supply line assembly for selectively discharging soap into said supply line assembly;
   a high-pressure pump connected to said supply line assembly for receiving said low-pressure pump output flow producing an output flow at approximately 600 psi; and,
   a wand flexibly attached to said supply line assembly for receiving said high-pressure output flow and having a head through which said output flow is discharged.

16. A portable cleaning assembly of claim 15, wherein said supply line assembly further comprises a pressure relief valve coupled to said high-pressure pump, such that said pressure relief valve causes the water under high pressure to recirculate in said high-pressure pump when said high pressure of water exceeds a predetermined level and causes the water under high pressure to be delivered to said wand when said high pressure of the water is less than said predetermined level.

17. The portable cleaning assembly of claim 15, wherein said water supply tank has approximately a 60-gallon capacity.

18. The portable cleaning assembly of claim 15, wherein said housing is approximately 2½ feet wide, 4 feet long, and 3½ feet wide.

19. The portable cleaning assembly of claim 17, wherein said housing is approximately 2½ feet wide, 4 feet long, and 3½ feet wide.

20. The portable cleaning assembly of claim 15, further including an outlet spigot attached to said housing and integral with said supply line to selectively provide water from said water supply tank through said low-pressure pump.

21. The portable cleaning assembly of claim 20, further including a bucket and a bracket attached to said housing for selectively attaching said bucket to said housing adjacent said outlet spigot.

22. The portable cleaning assembly of claim 15, wherein said soap injection system comprises:
 a soap container;
 a venturi connector integral with said supply line assembly and located between said low-pressure pump and said high-pressure pump, said venturi coupling in fluid communication with said soap container; and,
 a valve means integral with said supply line assembly for controlling flow from said soap container.

23. The portable cleaning assembly of claim 23, wherein said valve means includes a bypass line integral with said supply line assembly, said bypass line including a valve integral with said supply line assembly and said venturi coupling for selectively directing at least a portion of said low-pressure pump output flow around said venturi coupling.

24. A portable cleaning assembly of claim 15, further including a single motor attached to said housing for driving said pumps, said motor including a drive belt connected to said pumps.

25. The portable cleaning assembly of claim 15, wherein said wand comprises:
 (a) an elongated, tubular handle having a longitudinal axis and first and second ends, said first end of said handle for receiving the water under pressure; and,
 (b) a positionable head, comprising:
   (i) a flexible neck having a first end connected to said second end of said handle and a second end, said flexible neck carrying said water under pressure from said handle;
   (ii) a nozzle couple to said second end of said flexible neck for delivering the water under pressure a high-pressure spray; and,
   (iii) a spray shield having a base and an open end opposite said base, said base being connected to said nozzle and said second end of said flexible neck such that said high-pressure spray is discharged from said open end of the spray shield.

26. The portable cleaning assembly of claim 25, wherein said flexible neck comprises:
 a high-pressure hose connected at one end to said second end of said handle and at the other end to said nozzle; and,
 a coil spring that encircles said high-pressure hose has coils at either end to said second end of said handle and to said nozzle.

27. The portable cleaning assembly of claim 25, wherein said wand further comprises a locking means for locking said positionable head in a desired position.

28. The portable cleaning assembly of claim 27, wherein said locking means comprises:
 a rod connected at one end to said base of said spray shield, such that when one said flexible neck is bent, a tension and force is applied to said rod; and,
 a locking ring slidably mounted on said handle and connected to the other end of said rod, said handle passing through the hole of said locking ring such that said locking ring is slidable along said handle and the hole of said locking ring is substantially perpendicular to said longitudinal axis of said handle and said locking ring resists sliding along said handle when the hole of said locking ring is tilted away from being substantially perpendicular to said longitudinal axis of said handle, wherein said tension and force applied to said rod by said flexible neck causes said locking ring to tilt and lock said spray shield and said nozzle in said desired position.

29. The portable cleaning assembly of claim 25, wherein said wand further comprises a trigger for controlling the water flowing to said nozzle.

* * * * *

UNITED STATES PATENT AND TRADEMARK OFFICE
CERTIFICATE OF CORRECTION

PATENT NO. : 5,029,758
DATED : July 9, 1991
INVENTOR(S) : S. Chayer

It is certified that error appears in the above-identified patent and that said Letters Patent is hereby corrected as shown below:

| COLUMN | LINE | ERROR |
|--------|------|-------|
| 1 | 32 | Delete "high pressure" and insert --high-pressure-- therefor |
| 3 | 54 | Delete "form" and insert --from-- therefor |
| 5 | 55 | Delete "tank" and insert --tank 42-- therefor |
| 7 | 4 | Delete "trigger 204" and insert --trigger 202-- therefor |
| 9 | 11 | Delete "and output" and insert --an output-- therefor |
| 9 | 55 | Delete "high pressure" and insert --high-pressure-- therefor |
| 9 | 66 | After "portable" insert --cleaning assembly-- |
| 11 | 32 | Delete "Claim 23" and insert --Claim 22-- therefor |
| 12 | 6 | Delete "couple" and insert --coupled-- therefor |

Signed and Sealed this

Twenty-third Day of February, 1993

Attest:

STEPHEN G. KUNIN

*Attesting Officer*  *Acting Commissioner of Patents and Trademarks*